United States Patent
Asai

(10) Patent No.: US 9,274,734 B2
(45) Date of Patent: Mar. 1, 2016

(54) RECORDING SYSTEM, NON-TRANSITORY STORAGE MEDIUM STORING INSTRUCTIONS EXECUTABLE BY MOBILE TERMINAL, AND IMAGE RECORDING APPARATUS

(71) Applicant: BROTHER KOGYO KABUSHIKI KAISHA, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/700,244

(22) Filed: Apr. 30, 2015

(65) Prior Publication Data

US 2015/0317115 A1  Nov. 5, 2015

(30) Foreign Application Priority Data

Apr. 30, 2014 (JP) .................................. 2014-093431

(51) Int. Cl.
| | |
|---|---|
| *G06F 3/12* | (2006.01) |
| *H04W 4/00* | (2009.01) |
| *H04W 60/00* | (2009.01) |
| *H04W 84/12* | (2009.01) |

(52) U.S. Cl.
CPC .............. *G06F 3/1292* (2013.01); *G06F 3/1236* (2013.01); *H04W 4/008* (2013.01); *H04W 60/00* (2013.01); *H04W 84/12* (2013.01)

(58) Field of Classification Search
CPC ..... G06F 3/1292; G06F 3/1236; H04W 4/008; H04W 60/00; H04W 84/12
See application file for complete search history.

(56) References Cited

U.S. PATENT DOCUMENTS

| | | | |
|---|---|---|---|
| 2005/0018236 A1 | 1/2005 | Shirai et al. | |
| 2013/0148161 A1* | 6/2013 | Park ....................... | G06F 3/1296 358/1.15 |
| 2014/0355614 A1* | 12/2014 | Liu ....................... | H04L 61/2589 370/392 |

FOREIGN PATENT DOCUMENTS

JP            2005-044080 A       2/2005

\* cited by examiner

*Primary Examiner* — Iriana Cruz
(74) *Attorney, Agent, or Firm* — Scully, Scott, Murphy & Presser, PC

(57) ABSTRACT

A recording system includes: an image recording apparatus for image recording based on target data in a first format; a server device; and a mobile terminal including a wireless communication device, an operation device, and a controller. The controller transmits recording instruction information to the image recording apparatus when a recording instruction for the target data in a second format is received in a state in which the wireless communication device is connected to an access point. The controller instructs the server device to receive the target data in the second format, convert it to the first format, and cause the image recording apparatus to receive the target data and perform image recording, when the recording instruction for the target data in the second format is received in a state in which the wireless communication device is not connected to the access point.

17 Claims, 11 Drawing Sheets

FIG.10A

| MODEL NAME | Wi-Fi CONNECTION INFORMATION | ALTERNATIVE CONNECTION INFORMATION | | NFC FLAG |
|---|---|---|---|---|
| | IP ADDRESS | ACCOUNT INFORMATION | MAC ADDRESS | |
| MFC-A | 192.168.0.1 | brother@xyz.com | 15:61:3D:4E:A3:05 | ON |

FIG.10B

| MODEL NAME | GCP CONNECTION INFORMATION | ALTERNATIVE CONNECTION INFORMATION | | NFC FLAG |
|---|---|---|---|---|
| | ACCOUNT INFORMATION | MAC ADDRESS | IP ADDRESS | |
| MFC-B | patent@xyz.com | 28:5A:33:8C:14:D2 | 192.168.1.2 | OFF |

FIG.10C

| LATEST ACCOUNT INFORMATION | |
|---|---|
| LATEST USER ID | LATEST PASSWORD |
| patent@xyz.com | hijklmn |

FIG.11

| ACCOUNT INFORMATION | | MFC INFORMATION | |
|---|---|---|---|
| USER ID | PASSWORD | MODEL NAME | MAC ADDRESS |
| brother@xyz.com | abcdefg | MFC-A | 15:61:3D:4E:A3:05 |
| | | MFC-B | 81:29:1E:47:A5:96 |

| USER ID | PASSWORD | MODEL NAME | MAC ADDRESS |
|---|---|---|---|
| patent@xyz.com | hijklmn | MFC-C | 37:2E:19:AC:b4:68 |
| | | MFC-D | 28:5A:33:8C:14:D2 |

RECORDING SYSTEM, NON-TRANSITORY STORAGE MEDIUM STORING INSTRUCTIONS EXECUTABLE BY MOBILE TERMINAL, AND IMAGE RECORDING APPARATUS

CROSS REFERENCE TO RELATED APPLICATION

The present application claims priority from Japanese Patent Application No. 2014-093431, which was filed on Apr. 30, 2014, the disclosure of which is herein incorporated by reference in its entirety.

BACKGROUND

1. Technical Field

The following disclosure relates to (i) a recording system in which an image recording apparatus records an image based on recording instruction information transmitted wirelessly, (ii) a non-transitory storage medium storing a plurality of instructions executable by a processor of a mobile terminal, and (iii) the image recording apparatus.

2. Description of the Related Art

With the recent spread of mobile terminals, attention has been directed toward a technique for causing an image recording apparatus to record an image based on recording instruction information wirelessly transmitted from a mobile terminal. Also, there has been known a technique for reducing the number of operations for image recording by preregistering, into the mobile terminal, information about the image recording apparatus to which the recording instruction information is to be wirelessly transmitted. As a similar technique, there has been known a technique for monitoring a state of a registered default printer.

SUMMARY

However, a communication network used by the mobile terminal may be switched from one to another by movement of a user, which may inhibit the wireless transmission of the recording instruction information based on the registered information. In this case, information about the currently-used network has to be registered into the mobile terminal, requiring complicated operations of the user.

Accordingly, an aspect of the disclosure relates to a recording system allowing transmission of recording instruction information to an image recording apparatus through an appropriate communication path depending on a current communication environment, a non-transitory storage medium storing a plurality of instructions executable by a processor of a mobile terminal in the recording system, and the image recording apparatus.

In one aspect of the disclosure, a recording system includes: an image recording apparatus configured to perform a recording operation for recording an image on a recording medium based on target data in a first format; a server device configured to execute a relay processing including: a processing in which the server device converts target data in second format different from the first format, to the target data in the first format; and a processing in which the server device causes the image recording apparatus to receive the target data converted to the first format and perform the recording operation based on the target data; and a mobile terminal including: a wireless communication device configured to perform wireless communication with the image recording apparatus on a wireless LAN via an access point and configured to perform wireless communication with the server device on an internet; an operation device configured to receive an operation of a user; and a controller. The controller is configured to execute: a first processing including: a processing in which the controller converts the target data in the second format to the target data in the first format; and a processing in which the controller transmits recording instruction information to the image recording apparatus via the wireless communication device, the recording instruction information instructing the image recording apparatus to receive the target data converted to the first format and perform the recording operation; and a second processing in which the controller transmits relay instruction information to the server device via the wireless communication device, the relay instruction information instructing the server device to receive the target data in the second format and execute the relay processing. The controller is configured to execute: the first processing when a recording instruction for the target data in the second format is received by the operation device in a state in which the wireless communication device is connected to the access point; and the second processing when the recording instruction for the target data in the second format is received by the operation device in a state in which the wireless communication device is not connected to the access point.

In another aspect of the disclosure, a recording system includes: an image recording apparatus configured to perform a recording operation for recording an image on a recording medium based on target data in a first format; a server device configured to execute a relay processing including: a processing in which the server device converts target data in second format different from the first format, to the target data in the first format; and a processing in which the server device causes the image recording apparatus to receive the target data converted to the first format and perform the recording operation based on the target data; and a mobile terminal including: a wireless communication device configured to perform wireless communication with the image recording apparatus and the server device; an operation device configured to receive an operation of a user; and a controller. The controller is configured to execute: a first processing including: a processing in which the controller converts the target data in the second format to the target data in the first format; and a processing in which the controller transmits recording instruction information to the image recording apparatus via the wireless communication device, the recording instruction information instructing the image recording apparatus to receive the target data converted to the first format and perform the recording operation; a second processing in which the controller transmits relay instruction information to the server device via the wireless communication device, the relay instruction information instructing the server device to receive the target data in the second format and execute the relay processing; and an acquisition processing in which the controller acquires higher-priority processing information indicating a processing with a higher priority among the first processing and the second processing. When the higher-priority processing information indicates that the first processing is the processing with a higher priority, the controller is configured to execute: the first processing when a recording instruction for the target data in the second format is received by the operation device in a state in which wireless communication with the image recording apparatus is performable; and the second processing when the recording instruction is received by the operation device in a state in which wireless communication with the image recording apparatus is not performable. When the higher-priority processing information indicates that the second processing is the processing with a higher priority, the controller is configured to execute: the second processing when the recording instruction is received by the operation device in a state in which wireless communication with the server device is performable; and the first processing when the recording instruction is received by the operation device in a state in which wireless communication with the server device is not performable.

In another aspect of the disclosure, a non-transitory storage medium stores a plurality of instructions executable by a processor of a mobile terminal The mobile terminal includes: a wireless communication device configured to perform wireless communication with an image recording apparatus on a wireless LAN via an access point and configured to perform wireless communication with a server device on an internet; and an operation device configured to receive an operation of a user. The plurality of instructions, when executed by the processor, cause the mobile terminal to execute: a first processing including: a processing in which the mobile terminal converts target data in a second format to the target data in a first format; and a processing in which the mobile terminal transmits recording instruction information to the image recording apparatus via the wireless communication device, the recording instruction information instructing the image recording apparatus to receive the target data converted to the first format and perform a recording operation for recording an image on a recording medium based on the target data in the first format; and a second processing in which the mobile terminal transmits relay instruction information to the server device via the wireless communication device, the relay instruction information instructing the server device to: receive the target data in the second format; convert the target data in the second format to the target data in the first format; and transmit the recording instruction information to the image recording apparatus. The plurality of instructions, when executed by the processor, cause the mobile terminal to execute: the first processing when a recording instruction for the target data in the second format is received by the operation device in a state in which the wireless communication device is connected to the access point; and the second processing when the recording instruction for the target data in the second format is received by the operation device in a state in which the wireless communication device is not connected to the access point.

In another aspect of the disclosure, a non-transitory storage medium stores a plurality of instructions executable by a processor of a mobile terminal The mobile terminal includes: a wireless communication device configured to perform wireless communication with an image recording apparatus and configured to perform wireless communication with a server device; and an operation device configured to receive an operation of a user. The plurality of instructions, when executed by the processor, cause the mobile terminal to execute: a first processing including: a processing in which the mobile terminal converts target data in a second format to the target data in a first format; and a processing in which the mobile terminal transmits recording instruction information to the image recording apparatus via the wireless communication device, the recording instruction information instructing the image recording apparatus to receive the target data converted to the first format and perform a recording operation for recording an image on a recording medium based on the target data in the first format; a second processing in which the mobile terminal transmits relay instruction information to the server device via the wireless communication device, the relay instruction information instructing the server device to: receive the target data in the second format; convert the target data in the second format to the target data in the first format; and transmit the recording instruction information to the image recording apparatus; and an acquisition processing in which the mobile terminal acquires higher-priority processing information indicating a processing with a higher priority among the first processing and the second processing. The plurality of instructions, when executed by the processor and when the higher-priority processing information indicates that the first processing is the processing with a higher priority, cause the mobile terminal to execute: the first processing when a recording instruction for the target data in the second format is received by the operation device in a state in which wireless communication with the image recording apparatus is performable; and the second processing when the recording instruction is received by the operation device in a state in which wireless communication with the image recording apparatus is not performable. The plurality of instructions, when executed by the processor and when the higher-priority processing information indicates that the second processing is the processing with a higher priority, cause the mobile terminal to execute: the second processing when the recording instruction is received by the operation device in a state in which wireless communication with the server device is performable; and the first processing when the recording instruction is received by the operation device in a state in which wireless communication with the server device is not performable.

In another aspect of the disclosure, an image recording apparatus includes: a recording device configured to perform a recording operation for recording an image on a recording medium based on target data in a first format; a communication device communicable with a mobile terminal and a server device; and a controller configured to execute: a registration processing in which when having received account information from the mobile terminal via the communication device, the controller transmits the account information and identification information for identifying the image recording apparatus, the server device via the communication device; and a transmission processing in which when the registration processing is completed, the controller transmits registration completion information to the mobile terminal via the communication device. The account information is information for authentication of a privilege of causing the server device to execute a relay processing including: a processing in which the server device converts target data in second format different from the first format, to the target data in the first format; and a processing in which the server device causes the image recording apparatus to receive the target data converted to the first format and perform the recording operation based on the target data.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIGS. 10A through 10C are views each illustrating an example of information stored in a data storage area, wherein FIG. 10A illustrates an example in which Wi-Fi connection information, alternative connection information, and an NFC flag are associated with each other, FIG. 10B is an example in which GCP connection information, the alternative connection information, and the NFC flag are associated with each other, and FIG. 10C is an example of latest account information; and FIG. 11 is an example of the account information and MFC information stored in the server device.

DETAILED DESCRIPTION OF THE EMBODIMENT

Hereinafter, there will be described one embodiment by reference to the drawings. It is to be understood that the following embodiment is described only by way of example, and the disclosure may be otherwise embodied with various modifications without departing from the scope and spirit of the disclosure.

Figure 1:
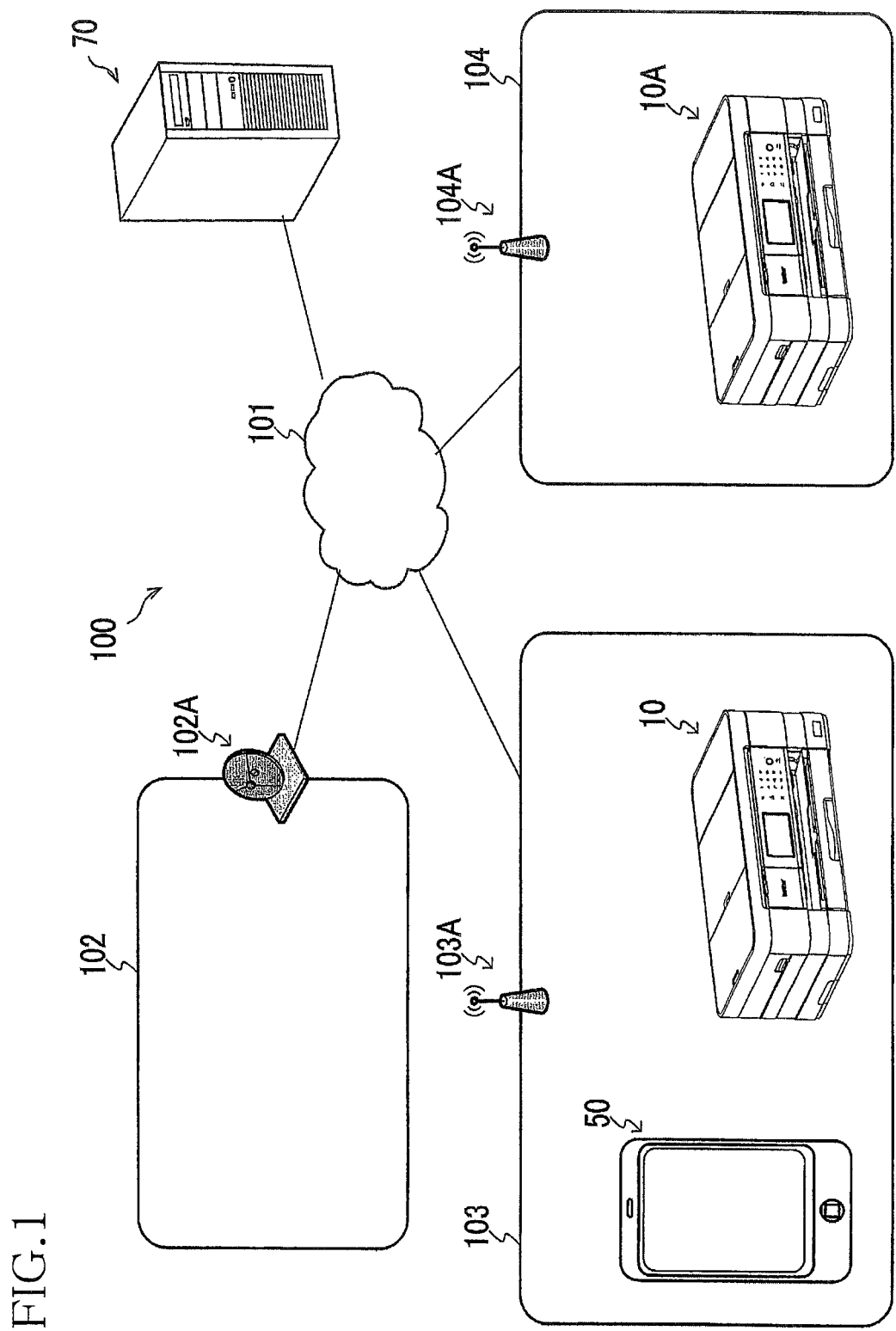
FIG. 1 is a schematic view illustrating a recording system according to one embodiment.

FIG. 1 illustrates a recording system 100. As illustrated in FIG. 1, the recording system 100 includes multi-function peripherals (MFPs) 10, 10A, a mobile terminal 50, and a server device 70. The MFPs 10, 10A, the mobile terminal 50, and the server device 70 are communicable with each other over a communication network. The communication network is not limited in particular, and examples of the communication network include Internet 101, a mobile communication network 102, wired LANs (Local Area Networks), wireless LANs 103, 104, and a combination of these networks.

In the example in FIG. 1, the mobile communication network 102 and the wireless LANs 103, 104 are connected to the Internet 101 via routers, not shown. The MFP 10 and the mobile terminal 50 are on the wireless LAN 103, and the MFP 10A is on the wireless LAN 104. The server device 70 is connected to the Internet 101. The MFPs 10, 10A, the mobile terminal 50, and the server device 70 are communicable with each other according to one or more communication standards. It is noted that the device on the wireless LAN 103 means a device which is set so as to be connected to the wireless LAN 103 and communicable with other devices on the wireless LAN 103. More specifically, the device on the wireless LAN 103 means a device assigned with the same SSID as that of an access point 103A of the wireless LAN 103 and having a network address assigned to the wireless LAN 103.

The MFP 10 on the wireless LAN 103 can use the access point 103A to perform wireless communication with the mobile terminal 50 on the wireless LAN 103 and the server device 70 connected to the Internet 101. The mobile terminal 50 on the mobile communication network 102 can use a base station 102A to perform wireless communication with the server device 70 connected to the Internet 101. The mobile terminal 50 on the wireless LANs 103, 104 can use the access point 103A and an access point 104A to perform wireless communication with the MFPs 10, 10A on the respective wireless LANs 103, 104 and the server device 70 connected to the Internet 101. The MFP 10 and the mobile terminal 50 can perform wireless communication with each other not via the access point 103A.

It is noted that the wireless communication via the base station 102A or the access points 103A, 104A is not limited to wireless communication performed over the entire communication route. That is, when the mobile terminal 50 wirelessly transmits or receives information or data via the base station 102A or the access points 103A, 104A, wireless connection may be established at least between the mobile terminal 50 and the base station 102A or the access points 103A, 104A. This applies to the MFPs 10, 10A.

MFP 10

Figure 2A:
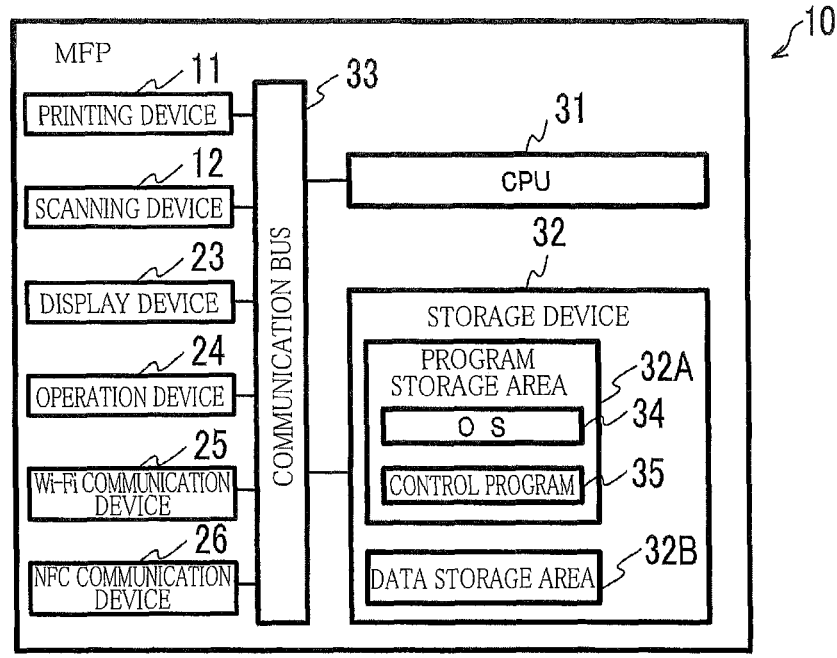
FIG. 2A is a block diagram illustrating a multi-function peripheral (MFP)
Figure 2B:
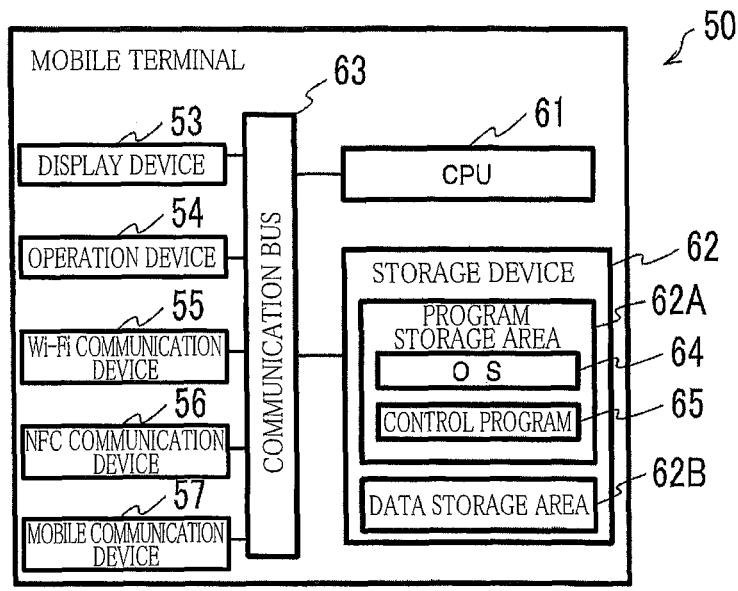
FIG. 2B is a block diagram illustrating a mobile terminal.

As illustrated in FIG. 2, the MFP 10 includes a printing device 11, a scanning device 12, a display device 23, an operation device 24, a Wi-Fi® (registered trademark of Wi-Fi Alliance) communication device 25, an NFC (Near Field Communication) communication device 26, a CPU (Central Processing Unit) 31, a storage device 32, and a communication bus 33. The devices of the MFP 10 are connected to each other via the communication bus 33. The MFP 10 is one example of an image recording apparatus. The printing device 11 is one example of a recording device. Each of the Wi-Fi communication device 25 and the NFC communication device 26 is one example of a communication device. It is noted that the MFPs 10, 10A have the same configuration, and only the MFP 10 will be explained in detail.

Printing Device 11 and Scanning Device 12

The printing device 11 performs a recording operation for recording an image on a recording sheet based on data in a first format. The recording sheet is one example of a recording medium. The printing device 11 may be a well-known printing device such as an ink-jet printing device or an electronic photographic printing device. The scanning device 12 performs a scanning operation for creating image data by reading an image recorded on a recording sheet. The MFP 10 may further have other functions including: a facsimile function for transmitting and receiving facsimiles; and a copying function for reading an image recorded on a recording sheet and recording the image on another recording sheet.

Display Device 23

The display device 23 includes a display screen for displaying various kinds of information thereon. The display device 23 may be constituted by any device such as a liquid crystal display (LCD) and an organic electroluminescent display (organic ELD).

Operation Device 24

The operation device 24 receives or accepts a user operation for selecting an object displayed on the display screen of the display device 23. Specifically, the operation device 24 includes push buttons, for example, and sends the CPU 31 a signal corresponding to a pushed one of the push buttons. The operation device 24 may further include a touch sensor shaped like a thin layer superposed on the display screen of the display device 23. That is, the display device 23 may be constituted as a touch panel display. The touch sensor may be constituted by a well-known sensor such as a capacitance sensor and a resistive film sensor.

It is noted that the object is an image selectable by the user operating the operation device 24. For example, the MFP 10 may be configured such that each of objects is a character string displayed on the display device 23, one of the displayed objects is highlighted by a push of a direction key of the operation device 24, and the highlighted object is selected by a push of a determination button of the operation device 24. As another example, in the case where the operation device 24 is a touch panel, the object may be an icon, a button, or a link displayed on the display device 23, for example, and the user may touch the object to select it.

Wi-Fi Communication Device 25

The Wi-Fi communication device 25 is an interface for wireless communication with external devices. Specifically, the Wi-Fi communication device 25 can perform (i) wireless communication with the mobile terminal 50 through indirect wireless connection via the access point 103A, (ii) wireless communication with the mobile terminal 50 through direct wireless connection not via the access point 103A, and (iii) wireless communication with the server device 70 via the access point 103A and the router, not shown. The Wi-Fi communication device 25 performs communication according to IEEE802.11 standards, for example. In this case, the indirect wireless connection refers to an infrastructure mode, and the direct wireless connection refers to an ad hoc mode or Wi-Fi Direct. The Wi-Fi communication device 25 is one example of a wireless communication device.

NFC Communication Device 26

The NFC communication device 26 is an interface for performing wireless communication through proximity wireless connection according to an NFC standard. The NFC communication device 26 includes an IC chip having a storage device which transfers information and the like with external devices. The NFC standard is one example of a proximity wireless communication standard, and the NFC communication device 26 is one example of a proximity wireless communication device. Another example of the proximity wireless communication standard is TransferJet® (registered trademark of TransferJet Consortium).

It is noted that a device capable of performing communication according to the NFC standard will be hereinafter referred to as "NFC device". That is, each of the MFP 10 and the mobile terminal 50 is one example of the NFC device. The NFC device is operated in any one of a P2P mode, a Reader mode, a Writer mode, and a CE mode. Also, combination of the Reader mode and the Writer mode may be hereinafter referred to as "R/W mode".

The P2P mode is a mode for two-way communication between a pair of NFC devices. An NFC device corresponding to Type A complying with ISO/IEC1443 specified on the NFC Forum and an NFC device corresponding to Type F complying with ISO/IEC18092 are operable in the P2P mode. An NFC device corresponding to Type B complying with ISO/IEC1443 is not operable in the P2P mode.

Each of the R/W mode and the CE mode is a mode for performing one-way communication between a pair of NFC devices. The CE mode is a mode in which an NFC device operates as a "card" which is a form defined on the NFC Forum. The NFC devices respectively corresponding to Type A, Type F, and Type B are operable in the CE mode. The Reader mode is a mode for reading information or the like from an NFC device operating in the CE mode. The Writer mode is a mode for writing various kinds of information into an NFC device operating in the CE mode.

The following explanation will be given assuming the MFP 10 operates in the R/W mode, and the mobile terminal 50 operates in the CE mode by way of example. That is, the MFP 10 operating in the R/W mode can read information or the like from the mobile terminal 50 operating in the CE mode and can write information or the like to the mobile terminal 50. However, the present invention is not limited to this configuration. For example, the recording system 100 may be configured such that the MFP 10 operates in the CE mode, and the mobile terminal 50 operates in the R/W mode and may be configured such that both of the MFP 10 and the mobile terminal 50 operate in the P2P mode.

In the present embodiment, the NFC communication device 26 of the MFP 10 performs a Poll operation. In the Poll operation, the NFC communication device 26 transmits a polling signal at predetermined time intervals and monitors a response signal which is a response to the polling signal. After the NFC communication device 26 receives the response signal, the CPU 31 hereinafter executes necessary processings. In the present embodiment, an NFC communication device 56 of the mobile terminal 50 performs a Listen operation. In the Listen operation, the NFC communication device 56 monitors the polling signal transmitted from the MFP 10 and transmits the response signal when having received the polling signal. After the NFC communication device 56 transmits the response signal, a CPU 61 hereinafter executes necessary processings.

The CPU 31 of the MFP 10 then acquires information from the mobile terminal 50 via the NFC communication device 26, and this information indicates in which mode the mobile terminal 50 is operable. Based on this information acquired from the mobile terminal 50, the CPU 31 determines a mode or modes in which the MFP 10 and the mobile terminal 50 are to be operated. The CPU 31 then controls the NFC communication device 26 to send the mobile terminal 50 an Activation command which indicates the operation mode of the mobile terminal 50. When the Activation command transmitted from the MFP 10 is received by the CPU 61 of the mobile terminal 50 via the NFC communication device 56, the CPU 61 controls the NFC communication device 56 to send the MFP 10 an OK command which is a response to the Activation command. As a result, a communication link using the NFC is established between the MFP 10 and the mobile terminal 50. The MFP 10 and the mobile terminal 50 thereafter transfer information and the like through this communication link.

When the CPU 31 of the MFP 10 then terminates the communication with the mobile terminal 50, the CPU 31 controls the NFC communication device 26 to send the mobile terminal 50 a Deactivation command for disconnecting the communication link. When the Deactivation command transmitted from the MFP 10 is received by the CPU 61 of the mobile terminal 50 via the NFC communication device 56, the CPU 61 controls the NFC communication device 56 to send the MFP 10 an OK command which is a response to the Deactivation command. As a result, the communication link between the MFP 10 and the mobile terminal 50 is disconnected.

CPU 31

The CPU 31 controls overall operations of the MFP 10. The CPU 31 acquires various kinds of programs which will be described below, from the storage device 32 to execute processings, based on various kinds of information output from the operation device 24 and various kinds of information acquired from the mobile terminal 50 or the server device 70 via the Wi-Fi communication device 25 or the NFC communication device 26, for example. That is, the CPU 31 and the storage device 32 are one example of a controller.

Storage Device 32

The storage device 32 includes a program storage area 32A and a data storage area 32B. The program storage area 32A stores an operating system (OS) 34 and a control program 35. It is noted that the control program 35 may be a single program and may be a collection of a plurality of programs. The data storage area 32B stores data and/or information required for execution of the control program 35. For example, the data storage area 32B stores information or data received from the mobile terminal 50 or the server device 70.

In the present specification, the term "data" and the term "information" are the same in that each of them is a bit or a bit string which can be handled by a computer. The data can be handled by the computer regardless of details indicated by each bit. The information causes branching in an operation of the computer depending on details indicated by each bit. Moreover, the term "instruction" is a control signal for demanding next operation to a device to which the instruction is transmitted, and may include the information or may have a nature of the information.

Also, even if the data and the information are changed in format (e.g., a text format, a binary format, and a flag format) for each computer, the computer treats the data before the change and the data after the change as the same data as long as the computer recognizes that the data before the change and the data after the change are substantially the same as each other. For example, information indicating "two" may be stored in one computer as information in a text format of "0x32" in the ASCII code and stored in another computer as information in a binary format of "10" as a binary number.

However, the data and the information are not strictly distinguished and may be treated exceptionally. For example, the data may be temporarily treated as the information, and the information may be temporarily treated as the data. Also, the data treated in one device may be treated as the information in another device, and vice versa. Furthermore, the information may be taken out from the data, and the data from the information.

The storage device 32 is, for example, constituted by a RAM (Random Access Memory), a ROM (Read Only Memory), an EEPROM (Electrically Erasable Programmable Read-Only Memory), an HDD (Hard Disk Drive), a buffer for the CPU 31, and other similar devices, or constituted by a combination of at least two of these devices. The storage device 32 may be a storage medium readable by a computer. The storage medium readable by a computer is a non-transitory medium. Examples of the non-transitory medium also include recording media such as a CD-ROM and a DVD-ROM. The non-transitory medium is also a tangible medium. However, an electrical signal for transmitting programs downloaded from, e.g., a server on the Internet is a signal medium readable by the computer as one kind of a medium readable by the computer but is not a non-transitory storage medium readable by the computer.

Programs stored in the program storage area 32A are executed by the CPU 31. However, in the present specification, an operation of each of the programs may be described without referring to the CPU 31. That is, the description meaning that "a program A executes a processing A" may indicate that "the CPU 31 executes the processing A written in the program A". This applies to the mobile terminal 50 and the server device 70 which will be described later.

The OS 34 is a basic program which provides an API (Application Programming Interface) for controlling hardware constituting the MFP 10 such as the printing device 11, the scanning device 12, the display device 23, the operation device 24, the Wi-Fi communication device 25, and the NFC communication device 26. That is, each of the above-mentioned programs controls the hardware by calling up the API provided by the OS 34. However, in the present specification, operations of the programs will be described without referring to the OS 34. That is, the description described later meaning that "program B controls hardware C" may indicate that "the program B controls the hardware C through the API of the OS 34". This applies to the mobile terminal 50 described later.

Mobile Terminal 50

As illustrated in FIG. 2, the mobile terminal 50 includes a display device 53, an operation device 54, a Wi-Fi communication device 55, the NFC communication device 56, a mobile communication device 57, the CPU 61, a storage device 62, and a communication bus 63. Each of the Wi-Fi communication device 55, the NFC communication device 56, and the mobile communication device 57 is one example of a communication device. The Wi-Fi communication device 55 is one example of a first communication device, and the NFC communication device 56 is one example of a second communication device. Each of the display device 53, the operation device 54, the Wi-Fi communication device 55, the NFC communication device 56, the CPU 61, the storage device 62, and the communication bus 63 has the same configuration of a corresponding one of the display device 23, the operation device 24, the Wi-Fi communication device 25, the NFC communication device 26, the CPU 31, the storage device 32, and the communication bus 33 of the MFP 10, and an explanation of which is dispensed with.

The mobile communication device 57 is an interface for performing wireless communication with devices on the mobile communication network 102 via the base station 102A or with the server device 70 connected to the Internet 101, for example. A program storage area 62A of the storage device 62 stores an OS 64 and a control program 65. As illustrated in FIG. 10, a data storage area 62B stores Wi-Fi connection information, GCP connection information, alternative connection information, an NFC flag, and a latest account information, for example.

Server Device 70

The server device 70 executes a relay processing. In this relay processing, the server device 70 receives target data in a second format different from the first format, converts the format of the target data from the second format to the first format, and causes the MFP 10 to perform the recording operation based on the target data in the converted or obtained first format. The server device 70 stores information illustrated in FIG. 11, for example. Any device may be employed as the server device 70. For example, the server device 70 may be a device for providing a Google Cloud Print® service provided by Google Inc. This service will be hereinafter referred to as "GCP".

As illustrated in FIG. 11, the server device 70 stores (i) account information containing a user ID and a password, and (ii) MFC information containing a model name and a MAC address such that the account information and the MFC information are associated with each other, for example. The account information is used for authentication of a privilege of causing the server device 70 to execute the relay processing. The information illustrated in FIG. 11 is registered into the server device 70 in a registration processing which will be described below.

Operations of Recording System 100

There will be next explained operations of the recording system 100 with reference to FIGS. 3-11. In the MFP 10 according to the present embodiment, when recording instruction information containing target data in the first format is received by the Wi-Fi communication device 25, the printing device 11 records an image on a recording sheet based on the target data. In the mobile terminal 50 according to the present embodiment, when the operation device 54 has accepted a user operation of selecting target data representative of an image to be recorded on a recording sheet, the Wi-Fi communication device 55 transmits the recording instruction information to the MFP 10 (first processing), or the mobile communication device 57 transmits relay instruction information to the server device 70 (second processing).

Collecting Processing

Figure 3:
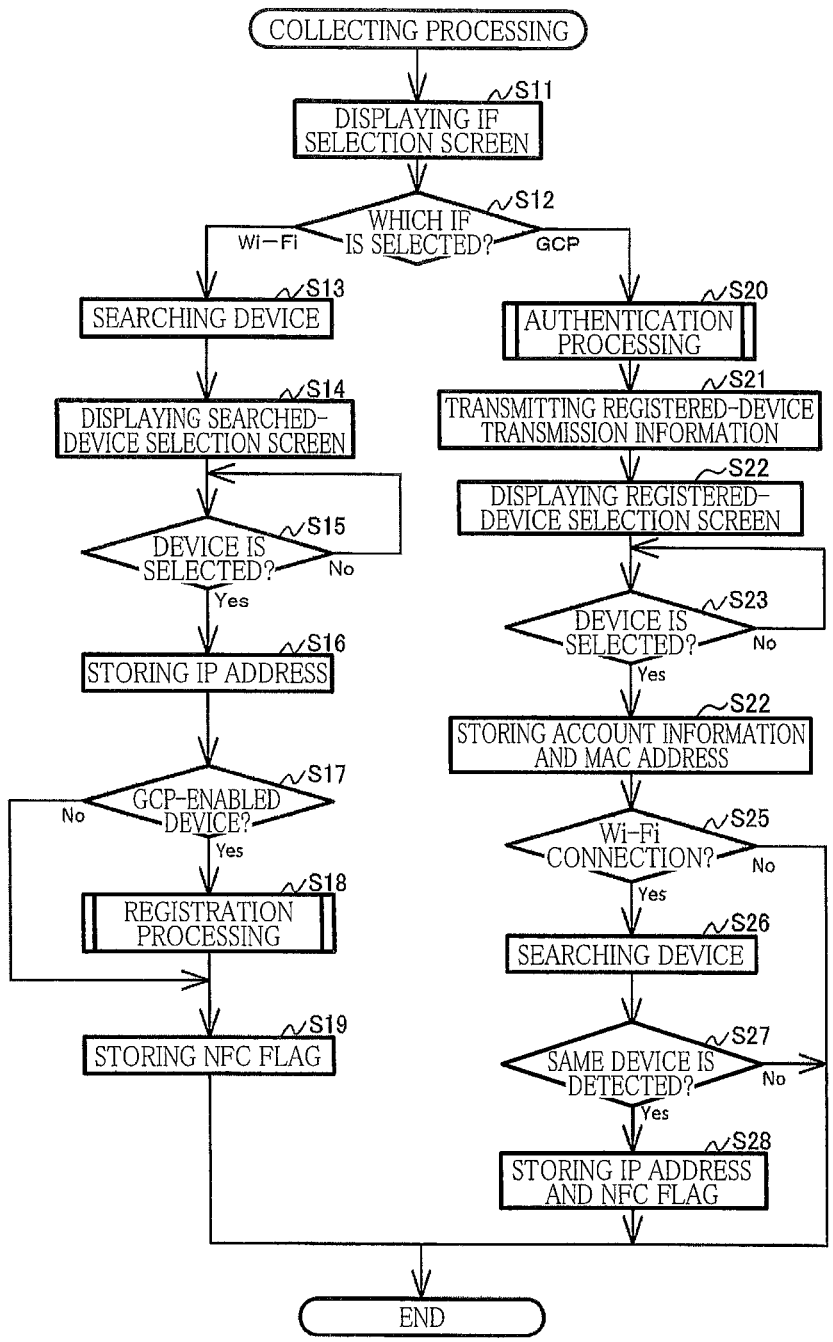
FIG. 3 is a flow chart illustrating a collecting processing.

There will be next explained a collecting processing with reference to the flow chart in FIG. 3. In this collecting processing, the mobile terminal 50 collects the Wi-Fi connection information, the GCP connection information, the alternative connection information, the NFC flag, and other data. It is noted that the Wi-Fi connection information is one example of first processing information, and the GCP connection information is one example of second processing information. The alternative connection information associated with Wi-Fi processing information (see FIG. 10A) is another example of the second processing information, and alternative connection information associated with GCP processing information (see FIG. 10B) is another example of the first processing information.

Figure 6B:
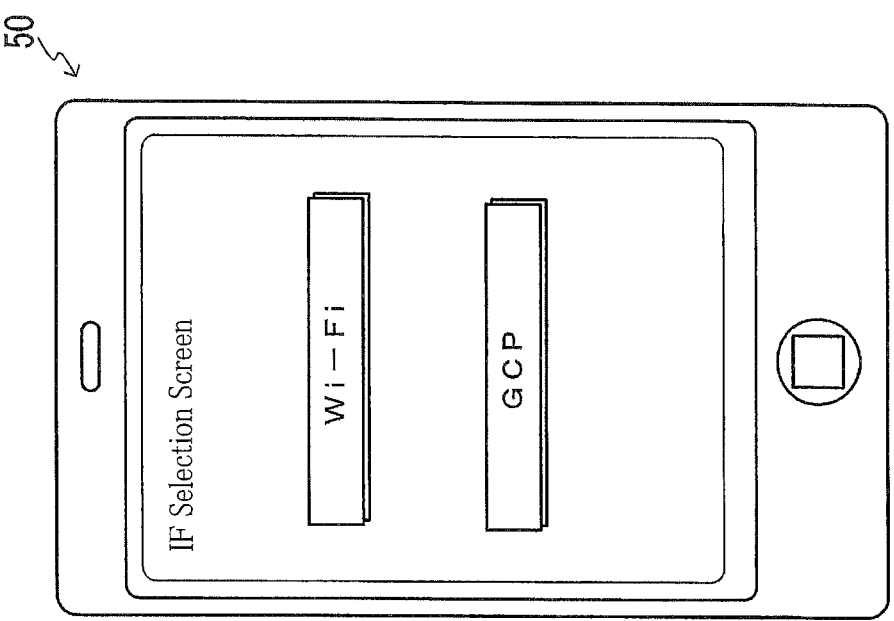
FIG. 6B is a view illustrating an IF selection screen.
Figure 6A:
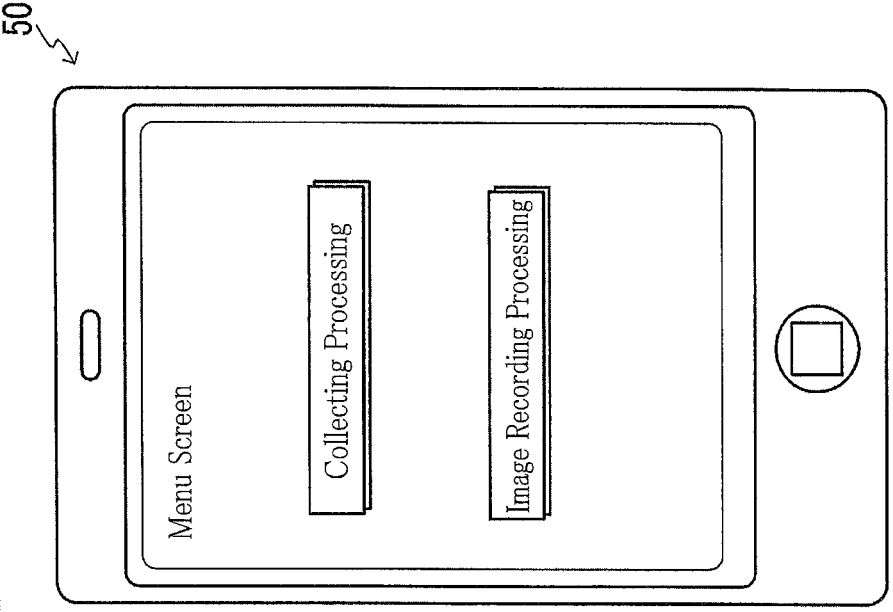
FIG. 6A is a view illustrating a menu screen.

The mobile terminal 50 executes the collecting processing illustrated in FIG. 3 according to the control program 65 when the operation device 54 has accepted a user operation of tapping on a collecting processing button displayed on a menu screen illustrated in FIG. 6A. This flow begins with S11 at which the control program 65 displays an IF selection screen on the display device 53. The screen illustrated in FIG. 6B is one example of the IF selection screen. The IF selection screen illustrated in FIG. 6B contains a Wi-Fi button and a GCP button. In this specification, a "when" clause indicates that in the case where a condition indicated by the "when" clause is satisfied, a processing described after the "when" clause is executed. It is noted that the processing may be executed at any timing after the condition is satisfied, and may not be executed immediately after the condition is satisfied.

When the operation device 54 has accepted a user operation of tapping on the Wi-Fi button (S12: Wi-Fi), the control program 65 at S13 searches a device on the wireless LAN 103, more specifically, a device including the printing device 11. A method of searching a device on the wireless LAN 103 is well known, and an explanation of which is dispensed with. The tapping on the Wi-Fi button is one example of an input of instruction for acquiring the first processing information required for execution of the first processing.

The control program 65 acquires various kinds of information from each of devices detected or found at S13. Examples of the information acquired at S13 include: a model name of the detected device; an IP address of the detected device on the wireless LAN 103; a MAC address of the detected device; a GCP flag indicating whether the detected device is a GCP-enabled device or not; and an NFC flag indicating whether the detected device is the NFC device or not. The information acquired S13 is partly registered in an MIB (Management Information Base) of each device and acquired according to an SNMP (Simple Network Management Protocol).

Figure 7B:
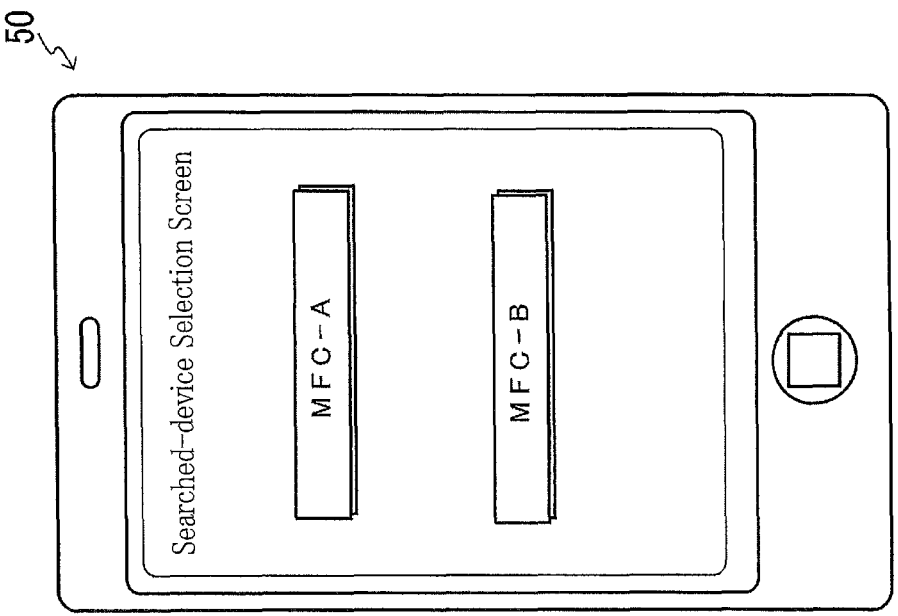
FIG. 7B is a view illustrating a password input screen.
Figure 7A:
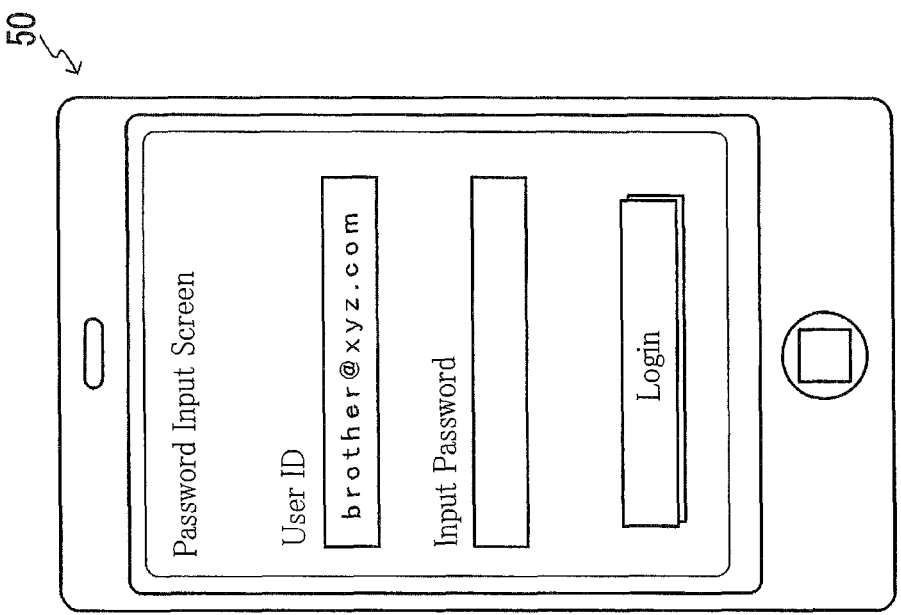
FIG. 7A is a view illustrating a searched-device selection screen.

At S14, the control program 65 displays a searched-device selection screen on the display device 53. The screen illustrated in FIG. 7A is one example of the searched-device selection screen. The searched-device selection screen illustrated in FIG. 7A contains a button or buttons respectively indicating one or more devices detected at S13. Information identifying the device is described on each button. In FIG. 7A, a model name of the device is described on each button. In the present embodiment, it is assumed that a button with the model name "MFC-A" of the MFP 10 is selected in a processing at S15 which will be described below.

When the operation device 54 has accepted a user operation of tapping on one of the buttons illustrated in FIG. 7A (S15: Yes), the control program 65 at S16 stores the model name and the IP address of the detected device into the data storage area 62B in a state in which the model name and the IP address are associated with each other. In the present embodiment, as illustrated in FIG. 10A, the model name "MFC-A" and the IP address "192.168.0.1" of the MFP 10 are associated with each other and stored into the data storage area 62B. The IP address is location information which indicates a location of the detected device on the wireless LAN 103. The IP address is one example of the Wi-Fi connection information. As a result, the control program 65 can perform communication with the device identified by the IP address, according to TCP/IP. The Wi-Fi connection information is not limited to the IP address and may be a name of the detected device, a URL (Uniform Resource Locator), or other similar information as long as such information can uniquely identify the detected device in order for the control program 65 to designate and communicate with the device on the wireless LAN 103.

When the device selected at S15 is the GCP-enabled device (S17: Yes), the control program 65 at S18 executes the registration processing. When the device selected at S15 is not the GCP-enabled device (S17: No), this flow goes to S19. The determination of whether the device is the GCP-enabled device or not can be made based on the GCP flag acquired at S13. The GCP flag is one example of relay-processing executable/inexecutable information which indicates whether the device can be a device for which the relay processing is to be executed by the server device 70.

In the registration processing, the account information and the identification information for identifying the device selected at S15 are registered into the server device 70 in a state in which the account information and the identification information are associated with each other. There will be next explained the registration processing in detail with reference to the flow chart in FIG. 4A.

Figure 4A:
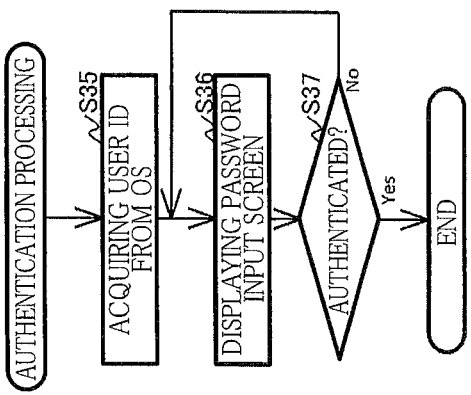
FIG. 4A is a flow chart illustrating a registration processing.
Figure 4B:
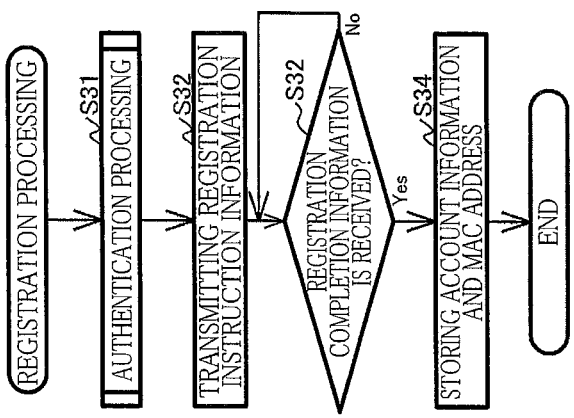
FIG. 4B is a flow chart illustrating an authentication processing.

This flow begins with S31 at which the control program 65 executes an authentication processing illustrated in FIG. 4B. In the authentication processing, the control program 65 checks whether a combination of the user ID and the password as the account information is registered in the server device 70 or not. The user ID is one example of a user identifier, and the password is one example of security information. It is noted that any information may be used as the security information. For example, a PIN (Personal Identification Number) code may be used as the security information.

The control program 65 at S35 acquires the user ID from the OS 64. The control program 65 at S36 displays a password input screen on the display device 53. The screen illustrated in FIG. 7B is one example of the password input screen. The password input screen illustrated in FIG. 7B contains the user ID acquired from the OS 64, a text box for input of the password, and a login button.

In the present embodiment, the OS 64 stores the user ID of the user who can use the programs operable on the OS 64. The control program 65 at S35 acquires the user ID from the OS 64. However, the user ID may not be acquired from the OS 64. For example, the user ID may be stored in the control program 65 and may be acquired from the user via the operation device 54.

When the operation device 54 has accepted the user operation of tapping on the login button, the control program 65 controls the Wi-Fi communication device 55 to send the server device 70 authentication instruction information containing the user ID acquired at S35 from the OS 64 and the password input to the text box, and then the control program 65 receives authentication result information, as a response to the authentication instruction information, from the server device 70 via the Wi-Fi communication device 55. The authentication result information indicates "AUTHENTICATED" in the case where a combination of the user ID and the password stored in the authentication instruction information is registered in the server device 70, and the authentication result information indicates "NOT AUTHENTICATED" in the case where the combination of the user ID and the password is not registered in the server device 70.

When the authentication result information indicates "AUTHENTICATED" (S37: Yes), this flow ends. When the authentication result information indicates "NOT AUTHENTICATED" (S37: No), this flow returns to S36 at which the control program 65 displays the password input screen on the display device 53 again. In the present embodiment, it is assumed that the user ID "brother@xyz.com" is acquired at S35, the password "abcdefg" is input at S36, and the authentication result information indicates "AUTHENTICATED" at S37.

In the following explanation, various kinds of information is transmitted and received between the mobile terminal 50 and the server device 70 via the access points 103A, 104A by way of example, but various kinds of information may be transmitted and received via the base station 102A. For example, the control program 65 may transmit the authentication instruction information to the server device 70 via the mobile communication device 57 and receive the authentication result information from the server device 70 via the mobile communication device 57. The various kinds of information is transmitted and received selectively via the base station 102A or the access points 103A, 104A depending upon a communication environment of the mobile terminal 50 and settings of the order of priority.

Returning to the flow in FIG. 4A, the control program 65 at S32 controls the Wi-Fi communication device 55 to transmit registration instruction information to the MFP 10 through the indirect wireless connection via the access point 103A. The registration instruction information is for instructing the MFP 10 to execute a processing in which the identification information on the MFP 10 and the account information authenticated at S31 are registered into the server device 70 in a state in which the identification information and the account information are associated with each other. The registration instruction information contains the account information authenticated at S31.

When the mobile terminal 50 has received registration completion information from the MFP 10 via the Wi-Fi communication device 55 through the indirect wireless connection via the access point 103A (S33: Yes), the control program 65 at S34 stores the MAC address acquired at S13 and the account information contained in the registration instruction information, into the data storage area 62B in association with the model name and the Wi-Fi connection information.

The MAC address is one example of the identification information for identifying the MFP 10. However, the identification information is not limited to the MAC address and may be any information as long as the information can uniquely identify the detected device. The associated account information and MAC address are one example of the alternative connection information. In the present embodiment, only the user ID of the account information is stored in the data storage area 62B, and the password is not stored in the data storage area. In the present embodiment, as illustrated in FIG. 10A, the account information "brother@xyz.com" and the MAC address "15:61:3D:4E:A3:05" are stored into the data storage area 62B in association with the Wi-Fi connection information.

When the registration instruction information transmitted from the mobile terminal 50 is received by the MFP 10 via the Wi-Fi communication device 25 through the indirect wireless connection, the control program 35 of the MFP 10 controls the Wi-Fi communication device 25 to send the server device 70 registration information containing (i) the account information contained in the registration instruction information and (ii) the MAC address of the MFP 10. In the present embodiment, the registration information further contains the model name of the MFP 10. This processing is one example of the registration processing. As a result, as illustrated in FIG. 11, the model name "MFC-A" and the MAC address "15:61:3D:4E:A3:05" are registered in the server device 70 in association with the user ID "brother@xyz.com" and the password "abcdefg".

When the MFP 10 has received registration result information as a response to the registration information, from the server device 70 via the Wi-Fi communication device 25, the control program 35 controls the Wi-Fi communication device 25 to transmit the registration completion information to the mobile terminal 50 through the indirect wireless connection. The registration result information and the registration completion information indicate that a combination of the account information and the MAC address contained in the registration information has been registered in the server device 70, that is, the registration processing is completed.

The control program 65 then at S19 in FIG. 3 stores the NFC flag of the device selected at S15, into the data storage area 62B in association with the Wi-Fi connection information and the alternative connection information, and this flow ends. In the present embodiment, as illustrated in FIG. 10A, the ON state of the NFC flag is stored into the data storage area 62B in association with the Wi-Fi connection information and the alternative connection information. It is noted that the NFC flag is ON in the case where the detected device is the NFC device, and the NFC flag is OFF in the case where the detected device is not the NFC device. The NFC flag is one example of proximity-connection usable/unusable information indicating whether wireless communication through the proximity wireless connection can be performed or not.

When the operation device 54 has accepted the user operation of tapping on the GCP button displayed on the IF selection screen (S12: GCP), the control program 65 at S20 executes the authentication processing illustrated in FIG. 4B. The authentication processing has been explained above, and an explanation of which is dispensed with. The tapping on the GCP button is one example of an input of instruction for acquiring the second processing information required for execution of the second processing.

The control program 65 at S21 controls the Wi-Fi communication device 55 to send the server device 70 registered-device transmission information containing the account information authenticated at S20. The registered-device transmission information is for causing the server device 70 to transmit a list of the identification information associated with the account information. In the present embodiment, the registered-device transmission information containing the user ID "patent@xyz.com" and the password "hijklmn" is transmitted to the server device 70, and two pieces of MFC information (see FIG. 11) associated with the account information are transmitted to the mobile terminal 50. Also, the MFC information in the present embodiment contains the model name and the MAC address.

Figure 8B:
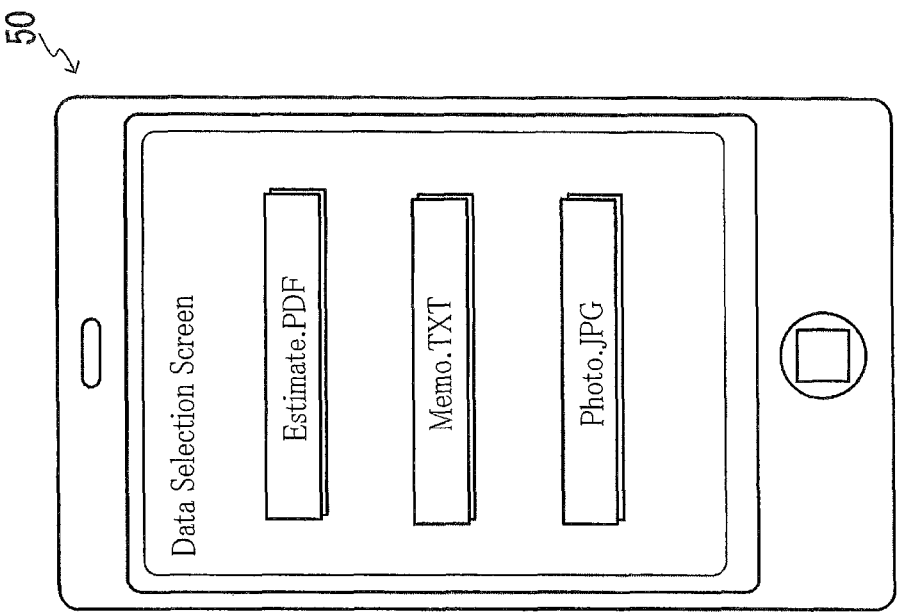
FIG. 8B is a view illustrating a data selection screen.
Figure 8A:
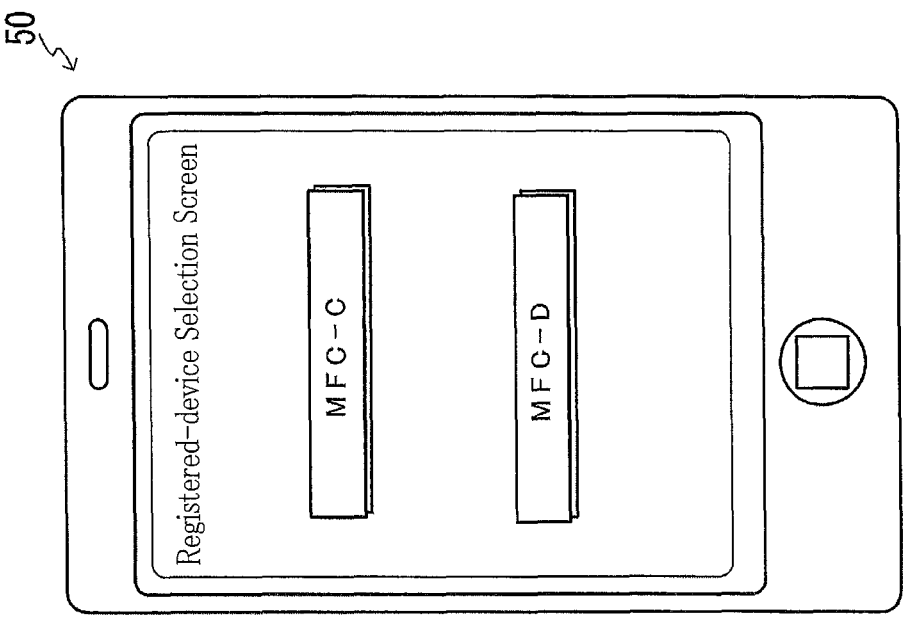
FIG. 8A is a view illustrating a registered-device selection screen.

The control program 65 at S22 displays a registered-device selection screen on the display device 53. The screen illustrated in FIG. 8A is one example of the registered-device selection screen. The registered-device selection screen illustrated in FIG. 8A contains buttons respectively indicating the pieces of the MFC information received at S21. Each of the buttons illustrated in FIG. 8A is provided with the model name contained in a corresponding one of the pieces of the MFC information. In the present embodiment, it is assumed that the button provided with the model name "MFC-C" of the MFP 10A is to be selected in a processing at S23 which will be described below.

When the operation device 54 has accepted a user operation of tapping on one of the buttons illustrated in FIG. 8A (S23: Yes), the control program 65 at S24 stores the model name and the MAC address of the detected device and the account information contained in the registered-device transmission information into the data storage area 62B in a state in which the model name and the MAC address and the account information are associated with each other. The associated account information and MAC address are one example of the GCP connection information. In the present embodiment, as illustrated in FIG. 10B, the model name "MFC-C" of the MFP 10A, the user ID "patent@xyz.com" contained in the account information, and the MAC address "28:5A:33:8C:14:D2" are stored into the data storage area 62B in a state in which these model name, user ID, and MAC address are associated with each other.

When the Wi-Fi communication device 55 is connected to any one of the access points 103A, 104A (S25: Yes), the control program 65 at S26 searches a device including the printing device 11 on the wireless LAN to which the Wi-Fi communication device 55 is connected. When the device having the MAC address contained in the GCP connection information is detected at S26 (S27: Yes), the control program 65 at S28 stores the NFC flag of the detected device and the IP address of the detected device as one example of the alternative connection information into the data storage area 62B in a state in which the NFC flag and the IP address are associated with the GCP processing information, and this flow ends.

That is, when the Wi-Fi communication device 55 is connected to the access point 104A, the control program 65 executes the processing at S28. As a result, as illustrated in FIG. 10B, the IP address "192.168.1.2" and the OFF state of the NFC flag of the MFP 10A are stored into the data storage area 62B in association with the GCP connection information. That is, the MFP 10A in the present embodiment is not the NFC device.

When the device having the MAC address contained in the GCP connection information is not detected at S26 (S27: No), this flow ends without execution of the processing at S28. Also, when the Wi-Fi communication device 55 is connected to any of the access points 103A, 104A (S25: No), this flow ends without execution of the processings at S26-28. It is noted that the control program 65 determines that the Wi-Fi communication device 55 is not connected to any of the access points 103A, 104A, in the case where the Wi-Fi communication device 55 does not have settings of connection to the access points 103A, 104A or in the case where the Wi-Fi communication device 55 cannot receive radio waves transmitted from the access points 103A, 104A, for example.

Image Recording Processing

Figure 5:
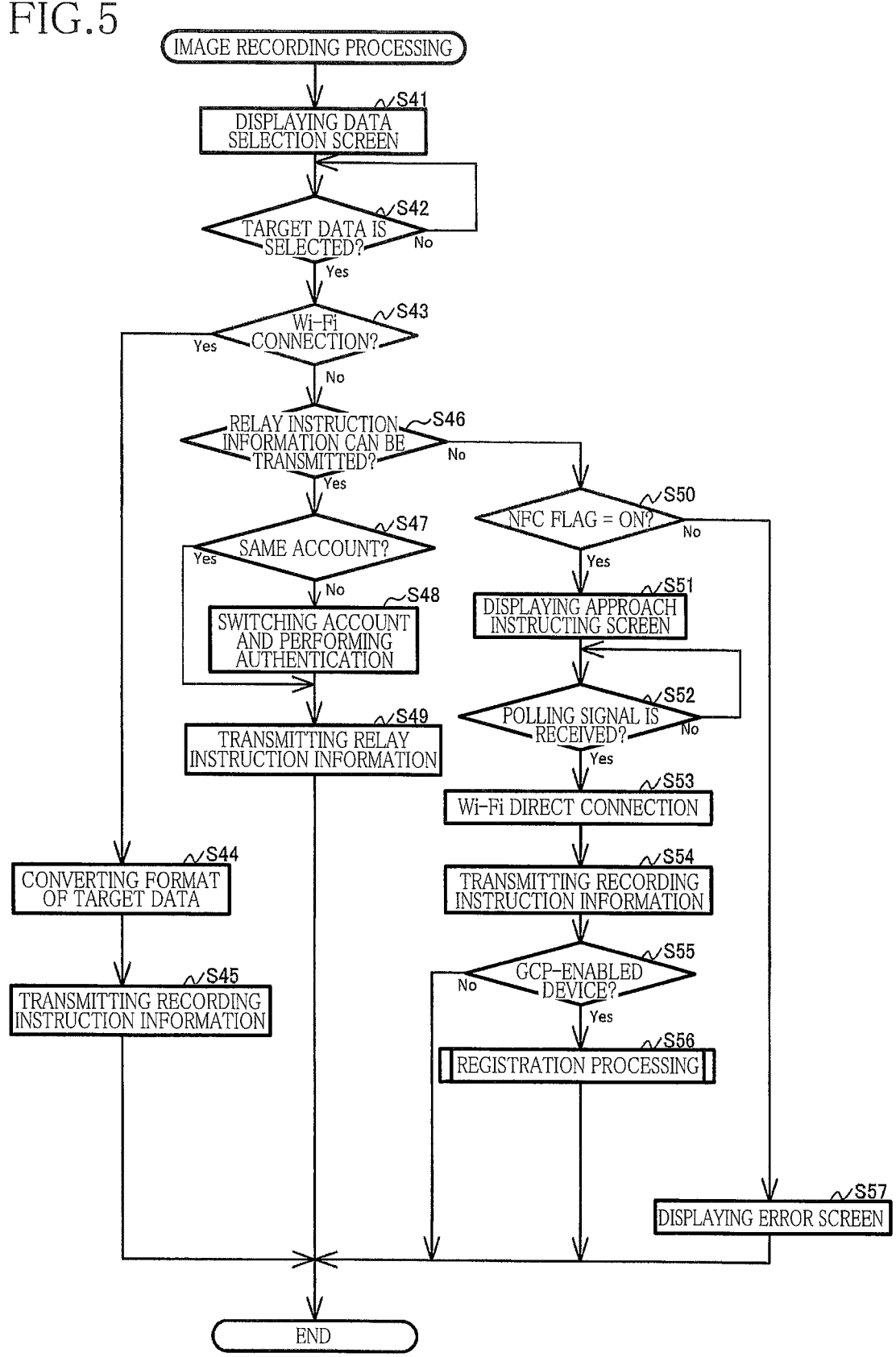
FIG. 5 is a flow chart illustrating an image recording operation.

There will be next explained an image recording processing with reference to FIG. 5. In this image recording processing, the control program 65 causes the printing device 11 of the MFP 10 to record an image on a recording sheet based on target data selected on the mobile terminal 50. In the image recording processing in the present embodiment, in the case where the first processing is executable, the mobile terminal 50 executes the first processing using the various kinds of information illustrated in FIG. 10A, and in the case where the first processing is not executable, the mobile terminal 50 executes the second processing using the various kinds of information illustrated in FIG. 10A. When the operation device 54 has accepted a user operation of tapping on an image recording processing button on the menu screen illustrated in FIG. 6A, the control program 65 of the mobile terminal 50 executes the image recording processing illustrated in the flow chart in FIG. 5.

This flow begins with S41 at which the control program 65 displays a data selection screen on the display device 53. The screen illustrated in FIG. 8B is one example of the data selection screen. The data selection screen illustrated in FIG. 8B contains one or more buttons. Each of the buttons is provided with a data identifier for identifying data which is a candidate of the target data. The number of buttons displayed on the data selection screen corresponds to the number of data selectable as the target data. Any data may be used as the data identifier, one example of which is a file name. The data selectable on the data selection screen may be data stored in the data storage area 62B of the mobile terminal 50 and may be data stored in a storage server, not shown, connected to the communication network.

When the operation device 54 has accepted a user operation of tapping on one of the buttons displayed on the data selection screen (S42: Yes), the control program 65 at S43 determines whether or not the Wi-Fi communication device 55 is connected to the access point 103A of the wireless LAN 103 on which the MFP 10 exists. In other words, the control program 65 at S43 determines whether the mobile terminal 50 can perform wireless communication with the MFP 10 through the indirect wireless connection or not. The tapping on the button displayed on the data selection screen is one example of an input of a recording instruction for selecting the target data in the second format and recording an image on a recording medium based on the selected target data. The following explanation will be given assuming that the user has tapped on the "Estimate.pdf" button.

When the Wi-Fi communication device 55 is connected to the access point 103A (S43: Yes), the control program 65 at S44 executes a conversion processing for converting the format of the target data from the PDF format to the JPEG format. The conversion processing may be executed by the control program 65 and may be executed by a server device, not shown, communicable over the communication network. That is, in the case where the conversion processing is executed by the server device, not shown, the control program 65 at S44 causes the server device to receive the target data in the PDF format and receives the target data in the JPEG format from the server, for example. In the case where the target data selected at S42 is in the JPEG format, this flow goes to S45 without execution of the processing in S44.

It is noted that the conversion of the format is a processing of changing a data structure of the target data, for example, and an image based on the target data is not substantially changed. For example, the wordings "image based on the target data is not substantially changed" include a concept in which a quality and colors (hereinafter referred to as "image quality") of the image based on the target data is slightly deteriorated due to conversion of the format of the target data from the PDF format to the JPEG format. The wordings "image based on the target data is not substantially changed" further include a concept in which the image quality is slightly improved by the conversion of the format.

A procedure of conversion of the format of the target data is well known, and an explanation of which is dispensed with. The JPEG format is one example of the first format, and the PDF format is one example of the second format. The first format and the second format are not limited to these formats, but the first format is more suitable for a forming processing than the second format. More preferably, the first format is a format allowing the printing device 11 to perform the recording operation, and the second format is a format not allowing the printing device 11 to perform the recording operation. That is, the first format and the second format may vary depending on the MFP 10 used.

The control program 65 at S45 controls the Wi-Fi communication device 55 to transmit the recording instruction information to the MFP 10 through the indirect wireless connection, and this flow ends. The recording instruction information is information for instructing the MFP 10 to receive the target data in the JPEG format converted from the PDF format and perform the recording operation based on the target data. For example, in the case where the conversion processing has been executed by the control program 65, the recording instruction information contains the target data whose format is converted to the JPEG format at S44. As another example, in the case where the conversion processing has been executed by the server device, not shown, the recording instruction information contains location information which indicates a location of the target data in the JPEG format on the server device. Any information may be used as the location information, one example of which is a URL (Uniform Resource Locator). The processings at S44, S45 are one example of the first processing.

When the Wi-Fi communication device 55 is not connected to the access point 103A (S43: No), the control program 65 at S46 determines whether the relay instruction information which will be described below can be transmitted to the server device 70 or not. The Wi-Fi communication device 55 is not connected to the access point 103A, in the case where the Wi-Fi communication device 55 does not have settings of connection to the access point 103A or in the case where the Wi-Fi communication device 55 cannot receive radio waves transmitted from the access point 103A, for example. Also, the relay instruction information can be transmitted to the server device 70 in the case where the alternative connection information is stored in the data storage area 62B, and at least one of the Wi-Fi communication device 55 and the mobile communication device 57 is connected to the Internet, for example. On the other hand, the relay instruction information cannot be transmitted to the server device 70 in the case where the alternative connection information is not stored in the data storage area 62B or in the case where neither of the Wi-Fi communication device 55 and the mobile communication device 57 is connected to the Internet, for example.

When the relay instruction information can be transmitted to the server device 70 (S46: Yes), the control program 65 at S47 determines whether the account information contained in the alternative connection information in FIG. 10A is identical to the latest account information illustrated in FIG. 10C or not. The latest account information is account information which is stored into the relay instruction information in the most-recent second processing. In the present embodiment, the control program 65 at S47 compares the user ID contained in the alternative connection information and the latest user ID contained in the latest account information with each other. The latest user ID is one example of a latest user identifier.

When the user ID contained in the alternative connection information differs from the latest user ID (S47: No), the control program 65 at S48 executes the authentication processing for the user ID contained in the alternative connection information. Specifically, the control program 65 controls the display device 53 to display the password input screen containing the user ID and controls the Wi-Fi communication device 55 to send the server device 70 the authentication instruction information containing the user ID and a password input on the password input screen. The processing at S48 is the same as the authentication processing illustrated in FIG. 4B except that the user ID is acquired from the alternative connection information.

The control program 65 at S49 controls the Wi-Fi communication device 55 to transmit the relay instruction information to the server device 70, and this flow ends. The relay instruction information is information for instructing the server device 70 to receive the target data in the second format and execute the relay processing. For example, the relay instruction information contains the target data selected at S41, the account information authenticated at S48, and the MAC address contained in the alternative connection information. Alternatively, instead of the target data, the relay instruction information may contain the location information stored in the storage server, not shown, which indicates the location of the target data. The control program 65 stores the account information contained in the relay instruction information, as the latest account information, into the data storage area 62B. That is, the latest account information illustrated in FIG. 10C is overwritten. The processings at S47-S49 are one example of the second processing.

When the user ID contained in the alternative connection information and the latest user ID are identical to each other (S47: Yes), this flow goes to S49 without execution of the processing at S48. Instead of the account information authenticated at S48, the control program 65 at S49 controls the Wi-Fi communication device 55 to send the server device 70 the relay instruction information containing the latest account information, and this flow ends.

When the relay instruction information cannot be transmitted to the server device 70 (S46: No), the control program 65 at S50 determines whether the NFC flag associated with the Wi-Fi connection information and the alternative connection information is ON or not. That is, processings at S50 and subsequent steps are executed when both of the first processing and the second processing are inexecutable (S43, S46: No).

Figure 9B:
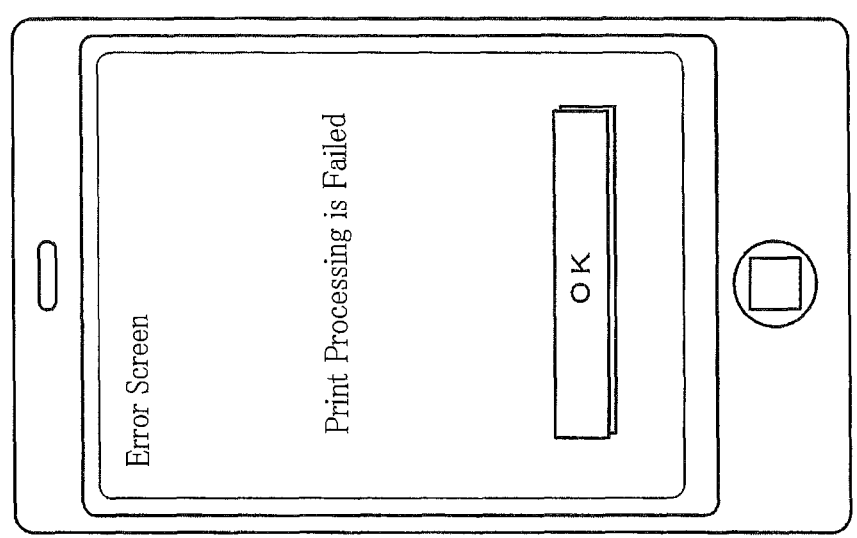
FIG. 9B is a view illustrating an error screen.
Figure 9A:
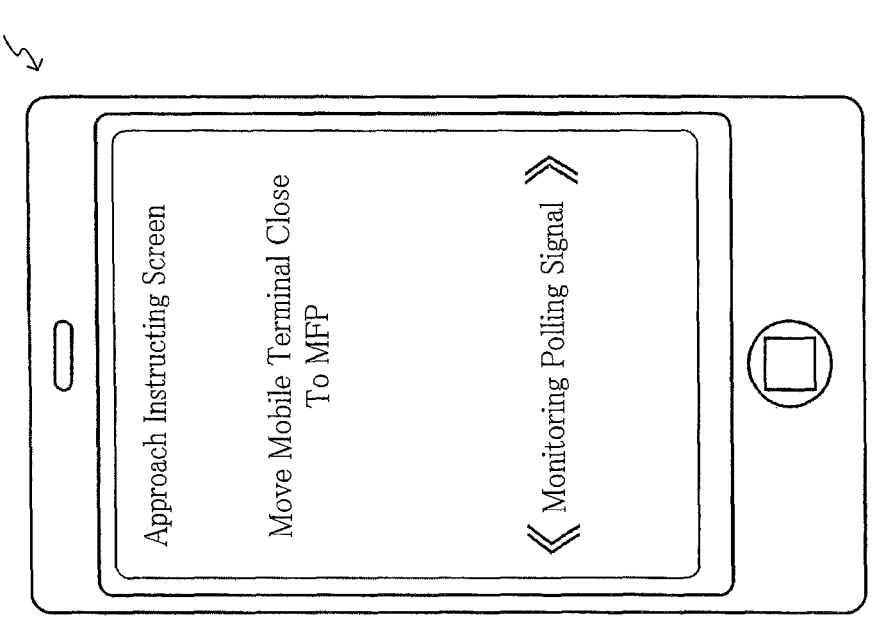
FIG. 9A is a view illustrating an approach instructing screen.

When the NFC flag is ON (S50: Yes), the control program 65 at S51 displays an approach instructing screen on the display device 53. The screen illustrated in FIG. 9A is one example of the approach instructing screen. The approach instructing screen illustrated in FIG. 9A is a screen for instructing the user to move the mobile terminal 50 to a location at which the NFC communication device 56 can receive the polling signal transmitted from the NFC communication device 26 of the MFP 10. The location at which the NFC communication device 56 can receive the polling signal is a location inside a sphere centered around the MFP 10 and having the radius of about 10 cm, for example. The processing at S51 is one example of a processing for indicating that the mobile terminal 50 should be brought closer to the MFP 10 until the MFP 10 is located inside a communicable range of the NFC communication device 56.

When the NFC communication device 56 has received the polling signal from the MFP 10 located in the communicable range of the NFC communication device 56 (S52: Yes), the control program 65 at S53 is connected to the MFP 10 through Wi-Fi Direct. When the Wi-Fi Direct connection is established, the control program 65 at S54 controls the Wi-Fi communication device 55 to transmit the recording instruction information to the MFP 10 through the direct wireless connection. The recording instruction information is the same as that explained at the processing in S45. The processings at S51-S54 will be hereinafter referred to as "third processing".

Specifically, the NFC communication device 26 of the MFP 10 is performing the Poll operation. The NFC communication device 56 of the mobile terminal 50 is performing the Listen operation at least while the approach instructing screen is displayed on the display device 53. When the NFC communication device 56 has received the polling signal from the NFC communication device 26 (S52: Yes), the control program 65 controls the NFC communication device 56 to acquire connection information from the MFP 10 and use the connection information to establish connection with the MFP 10 through Wi-Fi Direct. For example, the NFC communication device 26 operating in the R/W mode writes the connection information into an IC chip of the NFC communication device 56 operating in the CE mode. The connection information is information which is required for connection through Wi-Fi Direct. Examples of this connection information include an SSID (Service Set Identifier) and an encryption key.

When the MFP 10 is the GCP-enabled device (S55: Yes), the control program 65 at S56 executes the registration processing, and this flow ends. The registration processing at S56 is the same as the registration processing at S18 except that the registration instruction information and the registration completion information are transmitted and received between the MFP 10 and the mobile terminal 50 through the direct wireless connection. When the MFP 10 is not the GCP-enabled device (S55: No), this flow ends without execution of the processing at S56. It is noted that the determination of whether the MFP 10 is the GCP-enabled device or not may be made based on the GCP flag acquired from the MFP 10 via the Wi-Fi communication device 55 through the direct wireless connection.

When the NFC flag is OFF (S50: No), the control program 65 at S57 displays an error screen on the display device 53. The screen illustrated in FIG. 9B is one example of the error screen. The error screen illustrated in FIG. 9B contains an OK button and a message indicating a failure of a print processing. The processing at S57 is one example of a processing for indicating that the recording operation for the target data is inexecutable. When the operation device 54 has accepted a user operation of tapping on the OK button, this flow ends.

Having received the relay instruction information from the mobile terminal 50, the server device 70 converts the format of the target data from the second format to the first format and sends the MFP 10 the recording instruction information for instructing the MFP 10 to perform the recording operation based on the target data in the first format. It is noted that when the relay instruction information contains the target data in the second format, the server device 70 converts the format of the target data from the second format to the first format. When the relay instruction information contains the location information of the target data, on the other hand, the server device 70 receives the target data indicated by the location information and converts the format of the received target data from the second format to the first format. Also, when a combination of the account information and the MAC address stored in the relay instruction information has been registered, the server device 70 transmits the recording instruction information to the MFP 10 identified by the MAC address.

When the MFP 10 has received the recording instruction information from the mobile terminal 50 or the server device 70 via the Wi-Fi communication device 25, the control program 35 of the MFP 10 controls the printing device 11 to perform the recording operation based on the target data in the first format. It is noted that when the recording instruction information contains the target data in the first format, the control program 35 controls the printing device 11 to perform the recording operation based on the target data. When the recording instruction information contains the location information of the target data, the control program 35 receives the target data indicated by the location information and control the printing device 11 to perform the recording operation based on the target data.

Effects and Modifications

In the above-described embodiment, the first processing is executed when the MFP 10 and the mobile terminal 50 are connected to the same wireless LAN 103, and the second processing is executed when the MFP 10 and the mobile terminal 50 are not connected to the same wireless LAN 103. Also, when neither of the first processing and the second processing is executable, the third processing is executed. That is, the recording instruction information is transmitted to the MFP 10 through an appropriate communication path depending on the current communication environment of the mobile terminal 50. With this configuration, the MFP 10 can be caused to perform the recording operation according to the recording instruction information without complicated operations required of the user of the mobile terminal 50.

It is noted that the order of priority of the first processing, the second processing, and the third processing is not limited to that in the above-described embodiment. For example, the recording system 100 may be configured such that the second processing is executed when an input of the recording instruction is received by the operation device 54 in a state in which the operation device 54 can perform wireless communication with the server device 70, and the first processing is executed when an input of the recording instruction is received by the operation device 54 in a state in which the operation device 54 cannot perform wireless communication with the server device 70. In this configuration, the recording system 100 may be configured such that the GCP connection information illustrated in FIG. 10B is used in the second processing, and the alternative connection information illustrated in FIG. 10B is used in the first processing. Furthermore, when neither of the first processing and the second processing is executable, the third processing is executed as in the above-described embodiment.

The control program 65 may use higher-priority processing information to determine which processing is given a higher priority among the first processing and the second processing. A method of acquiring the higher-priority processing information is not limited in particular. For example, the higher-priority processing information may be acquired from the user via the operation device 54, and a most-recently executed one of the first processing and the second processing may be acquired as the higher-priority processing information. The processing for acquiring the higher-priority processing information is one example of an acquisition processing. Hereinafter, one of the first processing and the second processing which is indicated by the higher-priority processing information will be referred to as "higher-priority processing", and the other as "alternative processing".

The control program 65 may execute the higher-priority processing when the higher-priority processing is executable and execute the alternative processing when the higher-priority processing is not executable. Specifically, in the case where the higher-priority processing information indicates the first processing, the control program 65 determines whether the first processing is executable or not. The control program 65 executes the first processing when the first processing is executable and executes the second processing when the first processing is not executable. In the case where the higher-priority processing information indicates the second processing, on the other hand, the control program 65 determines whether the second processing is executable or not. The control program 65 executes the second processing when the second processing is executable and executes the first processing when the second processing is not executable.

In the above-described embodiment, the Wi-Fi button is tapped in the collecting processing, whereby the Wi-Fi connection information, the alternative connection information, and the NFC flag illustrated in FIG. 10A are collected. Likewise, the GCP button is tapped in the collecting processing, the GCP connection information, the alternative connection information, and the NFC flag illustrated in FIG. 10B are collected together. As thus described, information required for the alternative processing is also collected when information required for the higher-priority processing is collected. The required information can be collected without complicated operations required of the user of the mobile terminal 50.

In the above-described embodiment, when acquiring the account information, the control program 65 acquires the user ID from the OS 64 or the data storage area 62B and acquires the password from the user via the password input screen. This configuration can save a user having the privilege the input of the user ID and prevent a user not having the privilege from using the mobile terminal 50 to execute the second processing.

It is noted that the processing at S18 and the processings at S20-S24 in the collecting processing may be replaced with each other and may be both executed at their respective timings. For example, the control program 65 may execute the processings at S20-S22 first and execute the processings at S23-S24 when a desired device is displayed on the registered-device selection screen and execute the processing at S18 when no desired device is displayed on the registered-device selection screen.

In the MFP 10 or the mobile terminal 50 in each embodiment, the CPU 31, 61 execute various programs stored in the program storage areas 32A, 62A of the respective storage devices 32, 62, to execute processings to be executed by the controller. However, the configuration of the controller is not limited to this configuration. For example, the controller may be partly or entirely configured by hardware such as an integrated circuit (IC).

The present invention is achieved by the MFP 10 or the mobile terminal 50 in the above-described embodiment but may be achieved by programs for causing the MFP 10 or the mobile terminal 50 to execute processings. The programs may be stored in a non-transitory storage medium. Examples of the non-transitory storage medium include, in addition to a CD-ROM and a DVD-ROM, a storage device mounted on a server device connectable to the MFP 10 or the mobile terminal 50 over the communication network. The programs stored in the storage device of the server device may be distributed, as information or signals representing the programs, over the communication network such as the Internet.

What is claimed is:

1. A recording system, comprising:
    an image recording apparatus configured to perform a recording operation for recording an image on a recording medium based on target data in a first format;
    a server device configured to execute a relay processing comprising:
        a processing in which the server device converts target data in second format different from the first format, to the target data in the first format; and
        a processing in which the server device causes the image recording apparatus to receive the target data converted to the first format and perform the recording operation based on the target data; and
    a mobile terminal comprising:
        a wireless communication device configured to perform wireless communication with the image recording apparatus on a wireless LAN via an access point and configured to perform wireless communication with the server device on an internet;
        an operation device configured to receive an operation of a user; and
        a controller,
    the controller being configured to execute:
        a first processing comprising: a processing in which the controller converts the target data in the second format to the target data in the first format; and a processing in which the controller transmits recording instruction information to the image recording apparatus via the wireless communication device, the recording instruction information instructing the image recording apparatus to receive the target data converted to the first format and perform the recording operation; and
        a second processing in which the controller transmits relay instruction information to the server device via the wireless communication device, the relay instruction information instructing the server device to receive the target data in the second format and execute the relay processing,
    the controller being configured to execute:
        the first processing when a recording instruction for the target data in the second format is received by the operation device in a state in which the wireless communication device is connected to the access point; and
        the second processing when the recording instruction for the target data in the second format is received by the operation device in a state in which the wireless communication device is not connected to the access point.

2. The recording system according to claim 1,
    wherein the image recording apparatus is configured to execute a registration processing in which the image recording apparatus registers account information into the server device in association with identification information for identifying the image recording apparatus,
    wherein the server device is configured to execute the relay processing after completion of authentication using the registered account information,
    wherein when having received the relay instruction information comprising the account information and the identification information registered in association with each other, the server device causes the image recording apparatus identified by the identification information to receive the target data in the first format,
    wherein the mobile terminal further comprises a storage device,
    wherein the controller is configured to:
        acquire the account information;
        receive the identification information from the image recording apparatus via the wireless communication device;
        transmit the account information to the image recording apparatus via the wireless communication device to cause the image recording apparatus to execute the registration processing;

store the account information and the identification information as the second processing information into the storage device when the controller has received registration completion information indicating a completion of the registration processing, from the image recording apparatus via the wireless communication device; and transmit the relay instruction information comprising the second processing information stored in the storage device, to the server device via the wireless communication device in the second processing.

3. The recording system according to claim 2, wherein when the operation device has received an operation for instructing the mobile terminal to acquire first processing information required for execution of the first processing, the controller is configured to:

receive (i) location information indicating a location of the image recording apparatus on the wireless LAN, (ii) relay-processing executable information indicating whether the image recording apparatus complies with the relay processing to be executed by the server device, and (iii) the identification information, from the image recording apparatus via the wireless communication device;

store the location information as the first processing information into the storage device;

transmit the account information to the image recording apparatus via the wireless communication device to cause the image recording apparatus to execute the registration processing, when the relay-processing executable information indicates that the image recording apparatus complies with the relay processing to be executed by the server device for the image recording apparatus;

store the second processing information comprising the account information and the identification information, into the storage device in association with the first processing information when the controller has received the registration completion information from the image recording apparatus via the wireless communication device;

transmit the recording instruction information in the first processing via the wireless communication device to the image recording apparatus indicated by the first processing information stored in the storage device; and transmit relay processing information to the server device via the wireless communication device in the second processing, the relay processing information comprising the second processing information stored in the storage device in association with the first processing information.

4. The recording system according to claim 3, wherein the wireless communication device comprises:

a first communication device configured to perform wireless communication with the image recording apparatus through indirect wireless connection via the access point; and a second communication device configured to perform wireless communication through proximity wireless connection according to a proximity wireless communication standard, wherein the controller is configured to:

receive proximity-connection usable information from the image recording apparatus via the first communication device, the proximity-connection usable information indicating whether the image recording apparatus supports the proximity wireless connection;

store the proximity-connection usable information into the storage device in association with the first processing information; and cause the mobile terminal to indicate that the mobile terminal is to be brought closer to the image recording apparatus until the image recording apparatus is located within a communicable range of the second communication device, when the recording instruction is received by the operation device in a state in which the first processing and the second processing are not executable and when the proximity-connection usable information indicates that the image apparatus supports the proximity wireless connection.

5. The recording system according to claim 4, wherein the first communication device is configured to perform wireless communication with the image recording apparatus through direct wireless connection not via the access point, and wherein when the image recording apparatus is located within the communicable range of the second communication device and when connection information required for wireless communication with the image recording apparatus through the direct wireless connection is received from the image recording apparatus via the second communication device, the controller transmits the recording instruction information to the image recording apparatus via the first communication device through the direct wireless connection using the connection information.

6. The recording system according to claim 5, wherein when the recording instruction information is transmitted through the direct wireless connection, the controller is configured to:

acquire the account information; and transmit the account information to the image recording apparatus via the first communication device through the direct wireless connection to cause the image recording apparatus to execute the registration processing, and wherein when the controller has received the registration completion information from the image recording apparatus through the direct wireless connection via the first communication device, the controller stores the account information and the identification information as the second processing information into the storage device.

7. The recording system according to claim 4, wherein the controller is configured to cause the mobile terminal to indicate that the recording operation for the target data is not performable when the recording instruction is received by the operation device in the state in which the first processing and the second processing are not executable and when the proximity-connection usable information indicates that the image recording apparatus does not support the proximity wireless connection.

8. The recording system according to claim 2, wherein the controller is configured to:

acquire a user identifier from an OS, the user identifier being usably registered in the OS;

cause the mobile terminal to indicate that an operation for inputting security information corresponding to the user identifier is to be performed on the operation device; and when the security information is received by the operation device, transmit the account information comprising the user identifier and the security information, to the image recording apparatus via the wireless communication device, to cause the image recording apparatus to execute the registration processing.

9. The recording system according to claim 8,
wherein the storage device stores a latest user identifier which is the user identifier comprised in the relay instruction information in the second processing most recently executed, and
wherein when the user identifier acquired from the OS differs from the latest user identifier, the controller is configured, in the second processing, to:
cause the mobile terminal to indicate that the operation for inputting the security information corresponding to the user identifier is to be performed on the operation device;
when the security information is received by the operation device, transmit the relay instruction information comprising the user identifier and the security information, to the server device via the wireless communication device; and
store the user identifier comprised in the relay instruction information, as the latest user identifier, into the storage device.

10. A recording system, comprising:
an image recording apparatus configured to perform a recording operation for recording an image on a recording medium based on target data in a first format;
a server device configured to execute a relay processing comprising:
a processing in which the server device converts target data in second format different from the first format, to the target data in the first format; and
a processing in which the server device causes the image recording apparatus to receive the target data converted to the first format and perform the recording operation based on the target data; and
a mobile terminal comprising:
a wireless communication device configured to perform wireless communication with the image recording apparatus and the server device;
an operation device configured to receive an operation of a user; and
a controller,
the controller being configured to execute:
a first processing comprising: a processing in which the controller converts the target data in the second format to the target data in the first format; and a processing in which the controller transmits recording instruction information to the image recording apparatus via the wireless communication device, the recording instruction information instructing the image recording apparatus to receive the target data converted to the first format and perform the recording operation;
a second processing in which the controller transmits relay instruction information to the server device via the wireless communication device, the relay instruction information instructing the server device to receive the target data in the second format and execute the relay processing; and
an acquisition processing in which the controller acquires higher-priority processing information indicating a processing with a higher priority among the first processing and the second processing,
when the higher-priority processing information indicates that the first processing is the processing with a higher priority, the controller being configured to execute:
the first processing when a recording instruction for the target data in the second format is received by the operation device in a state in which wireless communication with the image recording apparatus is performable; and
the second processing when the recording instruction is received by the operation device in a state in which wireless communication with the image recording apparatus is not performable,
when the higher-priority processing information indicates that the second processing is the processing with a higher priority, the controller being configured to execute:
the second processing when the recording instruction is received by the operation device in a state in which wireless communication with the server device is performable; and
the first processing when the recording instruction is received by the operation device in a state in which wireless communication with the server device is not performable.

11. The recording system according to claim 10,
wherein the wireless communication device is configured to perform wireless communication with the image recording apparatus on a wireless LAN via an access point and configured to perform wireless communication with the server device on an internet, and
wherein when the higher-priority processing information indicates that the first processing is the processing with a higher priority, the controller is configured to execute:
the first processing when the recording instruction is received by the operation device in a state in which the wireless communication device is connected to the access point; and
the second processing when the recording instruction is received by the operation device in a state in which the wireless communication device is not connected to the access point.

12. The recording system according to claim 10,
wherein the server device stores account information and identification information in a state in which the account information and the identification information are associated with each other, wherein the identification information is for identifying the image recording apparatus,
wherein the server device is configured to execute the relay processing after completion of authentication using the registered account information,
wherein the server device is configured to cause the image recording apparatus identified by the identification information to receive the target data in the first format, when the server device has received the relay instruction information comprising the account information and the identification information associated with each other,
wherein the mobile terminal further comprises a storage device,
wherein when the operation device has received an operation for instructing the mobile terminal to acquire second processing information required for execution of the second processing, the controller is configured to:
acquire the account information;
transmit the acquired account information and an identification-information transmission instruction to the server device via the wireless communication device, the identification-information transmission instruction instructing the server device to transmit the identification information associated with the acquired account information, to the mobile terminal;

receive the identification information transmitted from the server device in response to the identification-information transmission instruction;

store the acquired account information and the received identification information as the second processing information into the storage device in a state in which the acquired account information and the received identification information are associated with each other;

receive location information from the image recording apparatus via the wireless communication device when the wireless communication device is connected to the access point, the location information indicating a location of the image recording apparatus indicated by the identification information on the wireless LAN; and store the location information, as first processing information required for execution of the first processing, into the storage device in a state in which the location information is associated with the second processing information, wherein the controller is configured to:

transmit relay processing information comprising the second processing information stored in the storage device, to the server device via the wireless communication device in the second processing executed when the higher-priority processing information indicates that the second processing is the processing with a higher priority; and transmit the recording instruction information via the wireless communication device to the image recording apparatus indicated by the first processing information stored in the storage device in association with the second processing information, in the first processing executed when the higher-priority processing information indicates that the second processing is the processing with a higher priority.

13. A non-transitory storage medium storing a plurality of instructions executable by a processor of a mobile terminal, the mobile terminal comprising: a wireless communication device configured to perform wireless communication with an image recording apparatus on a wireless LAN via an access point and configured to perform wireless communication with a server device on an internet; and an operation device configured to receive an operation of a user, the plurality of instructions, when executed by the processor, causing the mobile terminal to execute:

a first processing comprising: a processing in which the mobile terminal converts target data in a second format to the target data in a first format; and a processing in which the mobile terminal transmits recording instruction information to the image recording apparatus via the wireless communication device, the recording instruction information instructing the image recording apparatus to receive the target data converted to the first format and perform a recording operation for recording an image on a recording medium based on the target data in the first format; and a second processing in which the mobile terminal transmits relay instruction information to the server device via the wireless communication device, the relay instruction information instructing the server device to: receive the target data in the second format; convert the target data in the second format to the target data in the first format; and transmit the recording instruction information to the image recording apparatus, the plurality of instructions, when executed by the processor, causing the mobile terminal to execute:

the first processing when a recording instruction for the target data in the second format is received by the operation device in a state in which the wireless communication device is connected to the access point; and the second processing when the recording instruction for the target data in the second format is received by the operation device in a state in which the wireless communication device is not connected to the access point.

14. A non-transitory storage medium storing a plurality of instructions executable by a processor of a mobile terminal, the mobile terminal comprising: a wireless communication device configured to perform wireless communication with an image recording apparatus and configured to perform wireless communication with a server device; and an operation device configured to receive an operation of a user, the plurality of instructions, when executed by the processor, causing the mobile terminal to execute:

a first processing comprising: a processing in which the mobile terminal converts target data in a second format to the target data in a first format; and a processing in which the mobile terminal transmits recording instruction information to the image recording apparatus via the wireless communication device, the recording instruction information instructing the image recording apparatus to receive the target data converted to the first format and perform a recording operation for recording an image on a recording medium based on the target data in the first format;

a second processing in which the mobile terminal transmits relay instruction information to the server device via the wireless communication device, the relay instruction information instructing the server device to: receive the target data in the second format; convert the target data in the second format to the target data in the first format; and transmit the recording instruction information to the image recording apparatus; and an acquisition processing in which the mobile terminal acquires higher-priority processing information indicating a processing with a higher priority among the first processing and the second processing, the plurality of instructions, when executed by the processor and when the higher-priority processing information indicates that the first processing is the processing with a higher priority, causing the mobile terminal to execute:

the first processing when a recording instruction for the target data in the second format is received by the operation device in a state in which wireless communication with the image recording apparatus is performable; and the second processing when the recording instruction is received by the operation device in a state in which wireless communication with the image recording apparatus is not performable, the plurality of instructions, when executed by the processor and when the higher-priority processing information indicates that the second processing is the processing with a higher priority, causing the mobile terminal to execute:

the second processing when the recording instruction is received by the operation device in a state in which wireless communication with the server device is performable; and the first processing when the recording instruction is received by the operation device in a state in which wireless communication with the server device is not performable.

15. The non-transitory storage medium according to claim 13, wherein the wireless communication device comprises a first wireless communication device configured to perform wireless communication on the wireless LAN via the access point and a second wireless communication device configured to perform wireless communication via a base station, and wherein, in the second processing, the controller is configured to transmit the relay instruction information via one of the first wireless communication device and the second wireless communication device.

16. The non-transitory storage medium according to claim 13, wherein the controller is configured to execute the second processing when the recording instruction is received by the operation device in the state in which the wireless communication device is not connected to the access point of the wireless LAN on which the image recording apparatus exists.

17. The non-transitory storage medium according to claim 16, wherein the wireless communication device comprises a first wireless communication device configured to perform wireless communication on the wireless LAN via the access point and a second wireless communication device configured to perform wireless communication via a base station, wherein, in the second processing, the controller is configured to transmit the relay instruction information via one of the first wireless communication device and the second wireless communication device, and wherein, in the second processing, the controller is configured to transmit the relay instruction information via an access point of a wireless LAN on which the image recording apparatus does not exist, when the relay instruction information is transmitted via the first wireless communication device.

* * * * *